(12) United States Patent  (10) Patent No.: US 9,159,221 B1
Stantchev  (45) Date of Patent: Oct. 13, 2015

(54) STEERING WHEEL WITH REMOTE CONTROL CAPABILITIES

(71) Applicant: George Stantchev, Phoenix, AZ (US)

(72) Inventor: George Stantchev, Phoenix, AZ (US)

( * ) Notice: Subject to any disclaimer, the term of this patent is extended or adjusted under 35 U.S.C. 154(b) by 61 days.

(21) Appl. No.: 13/776,929

(22) Filed: Feb. 26, 2013

Related U.S. Application Data

(60) Provisional application No. 61/651,562, filed on May 25, 2012.

(51) Int. Cl.
| G08B 13/08 | (2006.01) |
| G08B 21/00 | (2006.01) |
| G08C 17/02 | (2006.01) |
| B62D 1/06 | (2006.01) |
| G08B 21/06 | (2006.01) |

(52) U.S. Cl.
CPC *G08C 17/02* (2013.01); *B62D 1/06* (2013.01); *G08B 13/08* (2013.01); *G08B 21/06* (2013.01)

(58) Field of Classification Search
CPC ...... G08B 13/08; G08B 21/06; E05B 45/086; B62D 1/06; B62D 1/046; G06F 3/03547; G06F 3/011
USPC ........ 340/5.83, 576, 438, 575, 465, 439, 475, 340/905, 902, 545.4, 686.1; 701/36, 41, 45; 345/156, 168, 169, 173–179
See application file for complete search history.

(56) References Cited

U.S. PATENT DOCUMENTS

| 4,706,072 | A * | 11/1987 | Ikeyama | 340/576 |
| 6,218,947 | B1 * | 4/2001 | Sutherland | 340/576 |
| 6,731,925 | B2 * | 5/2004 | Naboulsi | 455/345 |
| 7,019,623 | B2 * | 3/2006 | Klausner et al. | 340/425.5 |
| 7,414,520 | B2 * | 8/2008 | Mei.beta.ner | 340/438 |
| 7,456,777 | B2 * | 11/2008 | Piekarz | 341/176 |
| 7,602,278 | B2 * | 10/2009 | Prost-Fin et al. | 340/438 |
| 7,605,693 | B2 * | 10/2009 | Kulas | 340/438 |
| 7,605,694 | B2 * | 10/2009 | Prost-Fin et al. | 340/438 |
| 7,710,279 | B1 * | 5/2010 | Fields | 340/575 |
| 7,898,530 | B2 * | 3/2011 | Trachte | 345/173 |
| 7,961,085 | B2 * | 6/2011 | Almqvist et al. | 340/439 |
| 8,243,039 | B2 * | 8/2012 | Trachte | 345/173 |
| 8,248,270 | B2 * | 8/2012 | Nieves | 340/905 |
| 8,446,265 | B2 * | 5/2013 | Golomb | 340/425.5 |
| 8,537,133 | B2 * | 9/2013 | Trachte | 345/173 |
| 8,564,424 | B2 * | 10/2013 | Evarts et al. | 340/439 |
| 8,841,929 | B2 * | 9/2014 | Bennett et al. | 324/705 |
| 2003/0189493 | A1 * | 10/2003 | Klausner et al. | 340/575 |
| 2004/0263326 | A1 * | 12/2004 | Albrecht | 340/465 |
| 2005/0077159 | A1 * | 4/2005 | Min | 200/61.54 |
| 2005/0274591 | A1 * | 12/2005 | Kim | 200/61.54 |
| 2007/0050061 | A1 * | 3/2007 | Klein et al. | 700/94 |
| 2007/0100523 | A1 * | 5/2007 | Trachte | 701/41 |
| 2008/0042856 | A1 * | 2/2008 | Power | 340/575 |
| 2009/0209298 | A1 * | 8/2009 | Abeta et al. | 455/569.2 |
| 2009/0273458 | A1 * | 11/2009 | Almqvist et al. | 340/439 |
| 2010/0218641 | A1 * | 9/2010 | Neumann et al. | 74/552 |

(Continued)

*Primary Examiner* — Hoi Lau
(74) *Attorney, Agent, or Firm* — Rosenberg, Klein & Lee

(57) ABSTRACT

Integrated touch sense controls installed at a steering wheel, steering wheel cover or decorative pieces installed at the steering wheel in order to capture the hands movements interpreter the finger gestures and control various devices in the car without distracting the driver while operating the vehicle. The steering wheel controls may also incorporate one or multiple displays for feedback and driver assistance. The display is located such that is always at the direct line of sight of the driver.

23 Claims, 17 Drawing Sheets

(56) References Cited

U.S. PATENT DOCUMENTS

| | | | |
|---|---|---|---|
| 2011/0045872 A1* | 2/2011 | Simmons | 455/557 |
| 2011/0115606 A1* | 5/2011 | Fu et al. | 340/5.83 |
| 2011/0130924 A1* | 6/2011 | Trachte | 701/41 |
| 2011/0133919 A1* | 6/2011 | Evarts et al. | 340/439 |
| 2011/0246028 A1* | 10/2011 | Lisseman et al. | 701/45 |
| 2011/0246902 A1* | 10/2011 | Tsai et al. | 715/740 |
| 2012/0150388 A1* | 6/2012 | Boissonnier et al. | 701/41 |
| 2012/0221200 A1* | 8/2012 | Golomb | 701/36 |
| 2012/0268406 A1* | 10/2012 | Trachte | 345/173 |
| 2012/0326735 A1* | 12/2012 | Bennett et al. | 324/705 |
| 2013/0063336 A1* | 3/2013 | Sugimoto et al. | 345/156 |
| 2014/0022070 A1* | 1/2014 | Golomb | 340/475 |
| 2014/0090505 A1* | 4/2014 | Okuyama et al. | 74/485 |
| 2014/0292661 A1* | 10/2014 | Graumann et al. | 345/168 |

* cited by examiner

STEERING WHEEL WITH REMOTE CONTROL CAPABILITIES

CROSS-REFERENCE TO RELATED APPLICATION

This application claims the benefit of U.S. Provisional Patent Application No. 61/651,562 filed May 25, 2012, the contents of which are hereby incorporated by reference.

TECHNICAL FIELD

This description relates generally to automotive, boat, RV and machinery fields where steering wheel is used for operating a motor vehicle and more specifically to an embedded remote control touch pads disposed on a steering wheel directly

BACKGROUND

The popularity of smart phones in the day to day life may cause safety issues when they are improperly used behind the wheel of a motor vehicle. Very often the attention of the driver has been drawn from a phone call or from the display of the smart phone rather than on the road and this implicates local laws and the driver safety.

Even today's most popular hands free interfaces require access to a control keys that are strictly designated by function and very often buried or located out of the reach of the driver so those would require extra attention to be manipulated. Examples of such keys are the controls integrated with the head unit, around the dash board or the arm rest.

The conventional devices available typically do not resolve the convenience and safety concerns in today's car. Therefore, there is a need for a safe operation of a smart phone in a vehicle in a manner of controls that are embedded in the steering wheel in a way that the buttons do not require drivers attention instead the hands position on the steering wheel have been analyzed and interpreted to control a smart phone and displayed on a single or set of displays located in a direct line of sight of the driver.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an easy to install remote control system as part of the steering wheel of vehicle and overcomes the problems of the previous known art. The remote control has embedded hand position sensors on the rear side of the wheel and sensors on the front necessary to navigate a smart phone. The sensors are made as touch sense pads instead as push buttons utilizing as example using capacitive sense or similar gesture recognition technology.

The sense pads are configured in a way to follow the finger natural positions and movement. The pads can be placed along the entire steering wheel grip with the consideration that the fingers may slide along or across in different places of the steering wheel. The slide pads are placed in the front side of the wheel. Sensitive pads may be placed at the rear of the wheel to detect the driver hands position at the steering wheel.

The invention may provide a set of display configurations always falling in the line of sight of the driver. As example a top display facing directly the driver. As well a set of two or three displays can be placed along the steering wheel. The steering wheel may utilize a G-sensor or similar to detect which display is currently on the top position and light it with proper instructions and/or placement of the characters.

The invention can be installed inside an OEM steering wheel, in a steering wheel cover or in a decorative cover pieces. The sensitive pads and displays are wired to an electronic assembly containing control circuit and power supply circuit. The power supply can be either from the vehicle or from a battery.

The control circuit also called interpreter in the light of this invention analyses the feedback from all the sensors placed at front and rear side of the steering wheel and may drive a single or multiple displays.

The invention is equipped with wireless interface placed by the control circuit in order to communicate with the cell phone. The invention may communicate to another external control unit called media center in the light of this invention.

The invention herein tends to provide: aesthetic touch sense controls embedded in the steering wheel, cover or decoration; smart finger gesture control of a cell phone without districting the driver; tracking driver's hands position at the steering wheel for safety; providing ergonomic native touch and slide finger sense; a line of sight display to the driver; non distractive controls of smart media or phone device; connecting to smart phone applications for navigation and traffic news; and monitoring both hands position at the steering wheel.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a remote control system. Although the present examples are described and illustrated herein as being implemented in a steering wheel system, the system described is provided as an example and not a limitation. As those skilled in the art will appreciate, the present examples are suitable for application in a variety of different types of remote control systems.

This invention relates to automotive, boat, RV and machinery fields where the steering wheel may be used for operating a vehicle. The examples provided describe an embedded remote control touch sensitive pads which may be disposed on a steering wheel, via cover or as ornamental additions and/or LCD displays allowing to capture driver's hands position, hands movements and finger touches. Alternatively the examples may be incorporated in a steering wheel as a unitized assembly. Those touches or movements may be analyzed, otherwise processed and used to remotely control devices as cell phones, media players, smart accessories, etc. An LCD display provides visual feedback to the operator in regards to navigation, multimedia, safety and other operator and vehicle related data obtained from a world wide area network, phone or vehicle.

Figure 1:
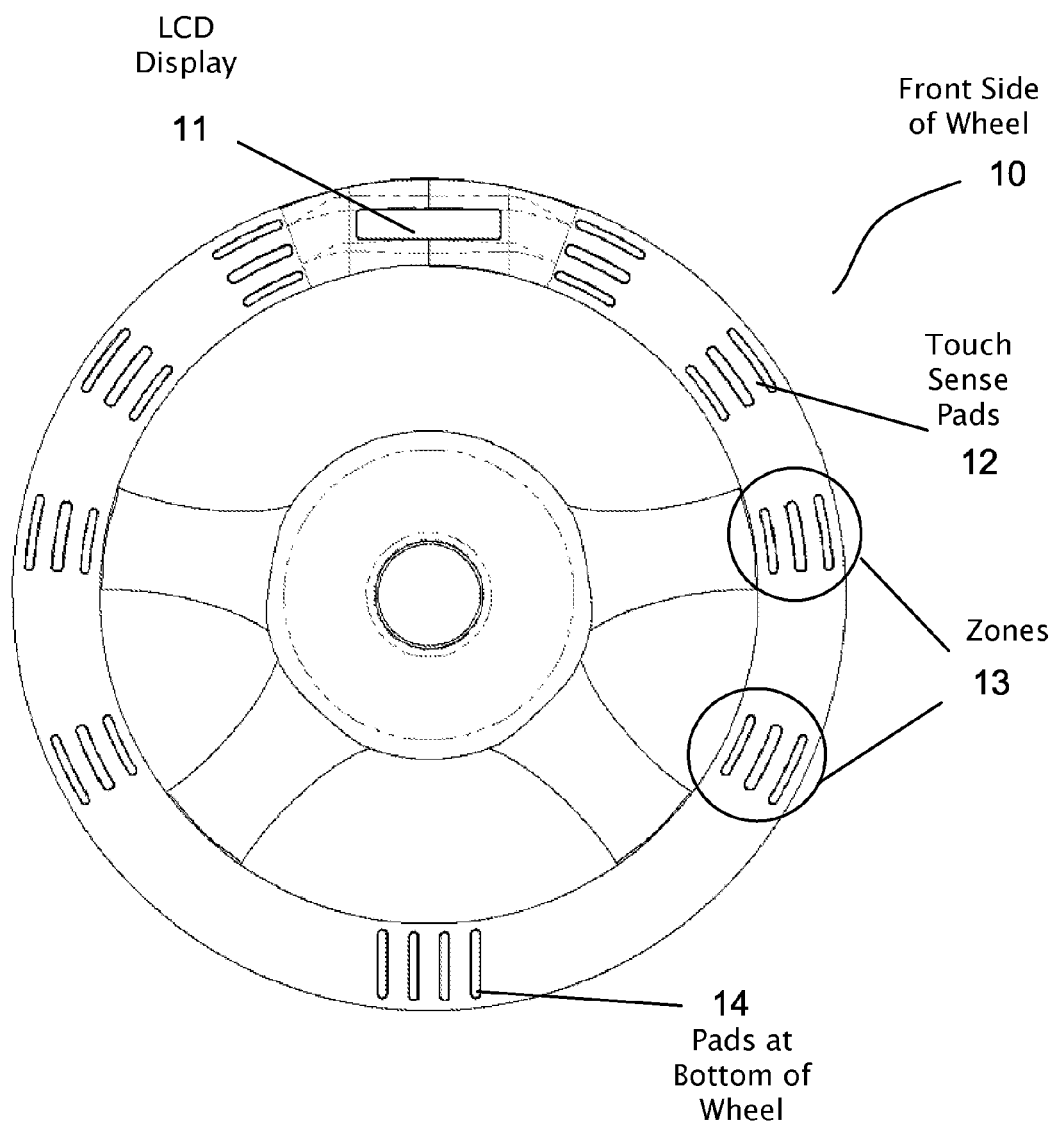
FIG. 1 is a front view of the steering wheel with a configuration of touch sense pads and an LCD display.

FIG. 1 is a front view of the steering wheel with a configuration of touch sense pads and an LCD display. The drawing shows a view of the front side of a steering wheel 10 with a location of an LCD display 11 and touch sense pads 12 for finger sense. The placement of the pads is designed in zones 13 where the thumb or other fingers can slide easy with natural swing. The design of the touch pads is ergonomic and along the slide of the fingers while relaxed on the steering wheel. As an example the pads on the top of the wheel 12 can be radial or positioned on an angle. The pads at the bottom of the wheel 14 may be positioned axially along the steering wheel grip. The pads may or may not be exposed to the surface of the steering wheel. Even the pads are not exposed on the cover they may be marked or designed ornamentally for convenience.

Figure 2:
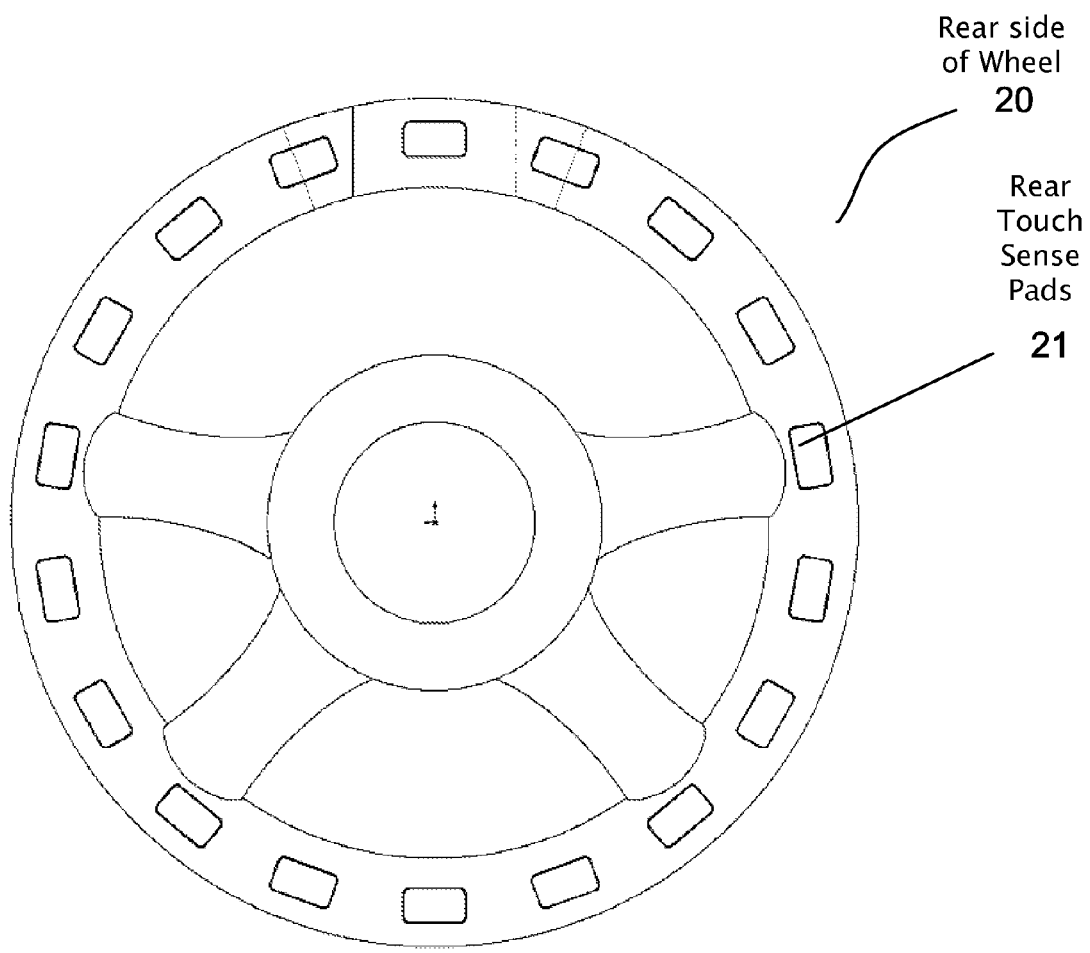
FIG. 2 is a rear view of the steering wheel showing a touch sense pads for locating the driver's hands position.

FIG. 2 is a rear view of the steering wheel showing a touch sense pads for locating the driver's hands position. The rear side of the steering wheel 20 has rear touch sense pads 21 distributed evenly for the purpose of detecting the hands position on the steering wheel. The main purpose of the rear touch sense pads is to coordinate the process for recognition of finger gestures and activate the touch pad sliders above the hands position.

A touchpad, track pad or touch sense sensor is a pointing device having a tactile sensor, that can translate the motion and position of a user's fingers to a relative position on screen or other device. Touchpads may constructed in several ways including, capacitive sensing and conductance sensing or the like.

There are several exemplary ways by which touchpads work that are known to those skilled in the art. In a matrix approach, a series of conductors are arranged in an array of parallel lines in two layers, separated by an insulator and crossing each other at right angles to form a grid. A high frequency signal may be applied sequentially between pairs in this two-dimensional grid array. The current that passes between the nodes tends to be proportional to the capacitance. When a virtual ground, such as a finger, is placed over one of the intersections between the conductive layer some of the electrical field is shunted to this ground point, resulting in a change in the apparent capacitance at that location. In a capacitive shunt method sensing of a change in capacitance between a transmitter and receiver that are on opposite sides of the sensor is performed to sense motion.

The touch pads shown at FIGS. 1 and 2 can be deposited as a multilayer capacitive touch film technology in an inner layer of an OEM steering wheel by example screen printing or built as cap sense technology in a flex circuit assembly when a cover or ornamental pieces are used.

Figure 3:
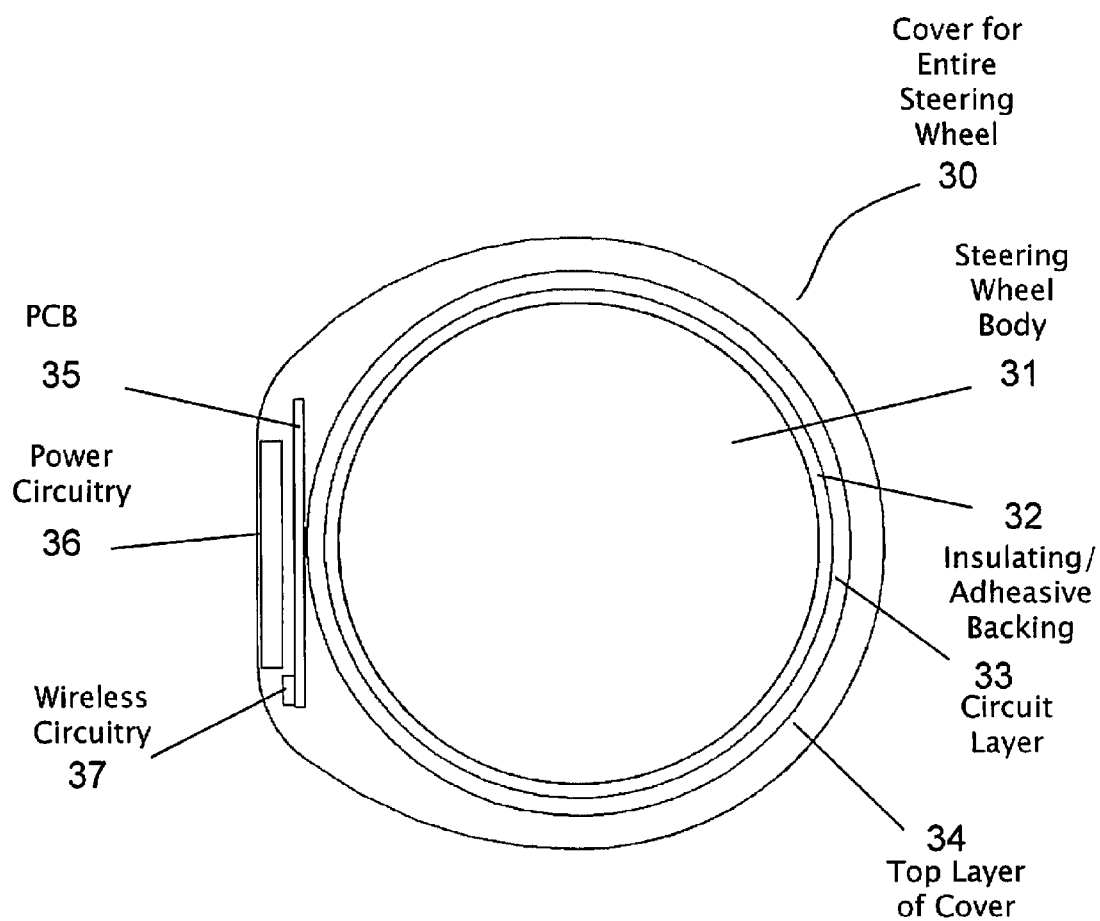
FIG. 3 is a section view of the steering wheel with the installation of the PCB.

FIG. 3 is a section view of the steering wheel with the installation of the printed circuit board ("PCB") or equivalently printed wiring board ("PWB") shown. The pads may be embedded in the steering wheel 30. The steering wheel cover may be designed as a multilayer structure that covers the steering wheel body 31 completely, or substantially completely. An example an embedded structure 30 may employ three or less layers to provide robustness, comfort and durability. The top layer 34 of a steering wheel cover may employ PVC, leather, rubber, cloth, etc. A second layer where a flex circuit or film is used 33 may incorporate the touch sense pads wired to a rigid or flex PCB 35, or its equivalent. A layer of isolation material 32 prevents the cover isolation from contacting the steering wheel core 31. The film or flex circuit layer 33 goes around the wheel or splits on front and rear layer to accommodate the touch sense pads required the invention to function. In this configuration the power circuitry 36 and the wireless circuitry 37 are present but may not be necessary in all implementations as the remote can be directly wired as a part of the steering wheel wiring.

In another configuration the pads may be embedded in a steering wheel cover 30 installed on a steering wheel 31. The steering wheel cover may be designed as a multilayer structure that covers the steering wheel body 31 completely. An example a cover 30 may employ 3 layers to provide robustness, comfort and durability. The top layer 34 of a steering wheel cover may employ microfiber, memory foam, leather, rubber, cloth, etc. A second layer where the flex circuit is installed incorporating the touch sense pads 33 wired to a rigid or flex PCB 35. An isolation layer of PVC backing or self-adhesive material 32 to prevents the cover from slipping and shifting around the steering wheel. The flex PCB circuit layer 33 goes around the wheel or splits on front and rear layer to accommodate the touch sense pads required the invention to function. The PCB 35 is powered with battery or a solar cell 36 circuitry embedded in the rear or top of the steering wheel cover. The remote control is interfacing to another device via the wireless interface 37. RF link interface 37 is installed at the PCB 35 to connect directly with the smart phone or a base station called media center 40.

Figure 4:
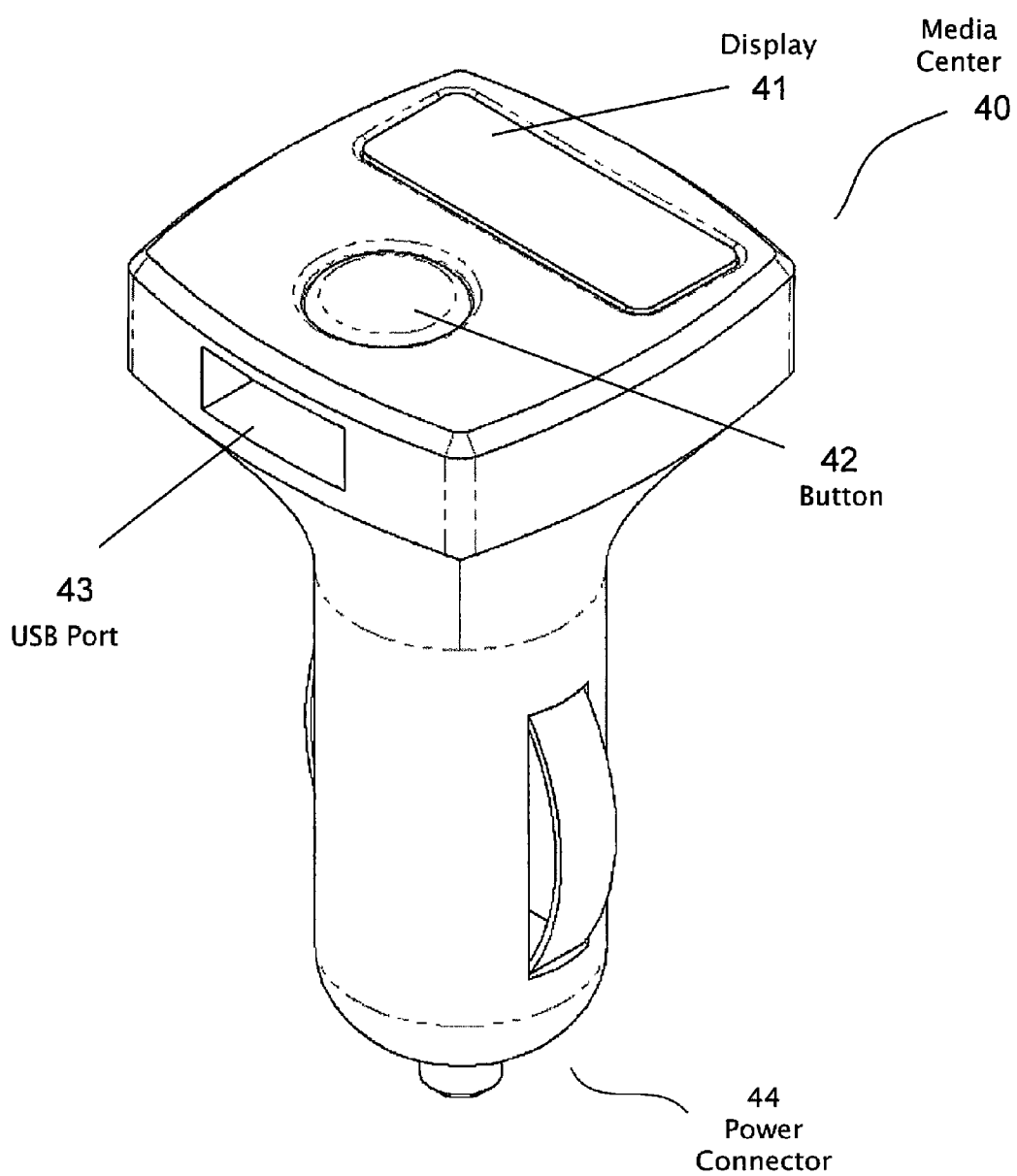
FIG. 4 is a view of the media center unit for cigarette lighter implementation.

FIG. 4 is a view of the media center unit 40 for cigarette lighter or power port disposition through a power connection 44. The media center 40 may plug in the cigarette lighter socket to draw power, or can be installed in direct connect to the vehicle radio or wiring harness to couple to audio and power. The media center 40 may have a typically bright LED (or its equivalent) display 41, a button 42 and a USB plug, or socket 43. The port 43 is described as a USB port, however in alternative examples the port may be the equivalent to a USB port, including various serial and parallel interfaces. The USB 43 can be used for phone charging and/or media playback.

The media center 40 may have an internal FM radio link (not shown) from its internal circuitry to the vehicle radio (not shown) that provides audio via the FM radio tuner audio circuit. The media center may route the audio to the car speakers via FM/AM modulation and/or wires connected directly to the radio harness. The media center may be paired to a smart phone and automatically finds the FM station where the radio is tuned.

The media center also couples to the steering wheel remote control described herein wirelessly. For example by utilizing paired receivers and transmitters (not shown) utilizing low power short range Industrial Scientific Medical ("ISM") band interface or its equivalent.

The media center may also couple to a smart phone. This may be accomplished either via USB serial interconnect and/or Bluetooth wireless link circuitry which may be provided for.

The button 42 provides the functions of push, and push and hold. For example a push changes a function, and push and hold accepts a command. Equivalently other sequences of command may be utilized, or multiple buttons, switches, dial or the like may be provided.

Figure 5:
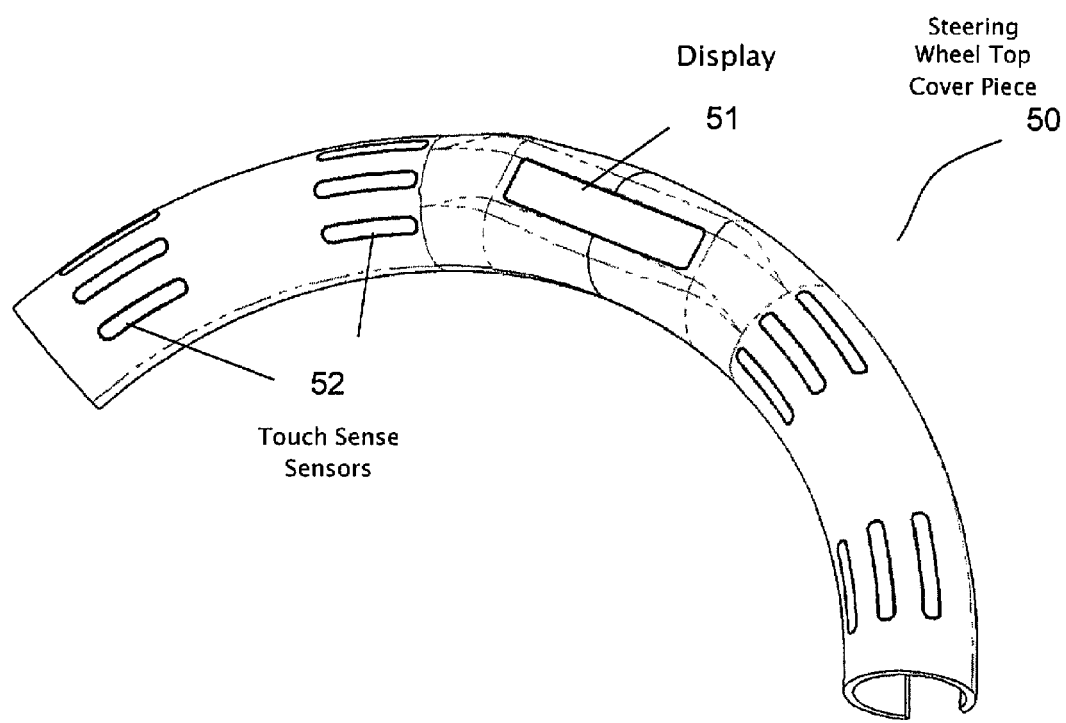
FIG. 5 is a view of an LCD display and touch sense sensors embedded in steering wheel top cover piece.

FIG. 5 is a view of an LCD display 51 (or its equivalent) and touch sense sensors 52 disposed in a steering wheel top cover piece 50. A removable remote control can be implemented as partial or decorative steering wheel cover 50 that snaps, or otherwise flexes to allow installation over an existing steering wheel, on the top portion of the steering wheel. The cover 50 may be made for example from a decorative plastic with an embedded LED display 51 and a plurality, such as an exemplary four or more touch sensors strips 52 disposed in the cover.

The ornamental cover 50 may internally incorporate a battery and the PCB circuit in the rear side of the cover behind the LCD display as shown at FIG. 3. The cover, if not used with a media center (40 of FIG. 4) can also include in alternative examples, a microphone and speakers and function as standalone hands free interface to a smartphone, or other mobile device.

Figure 6:
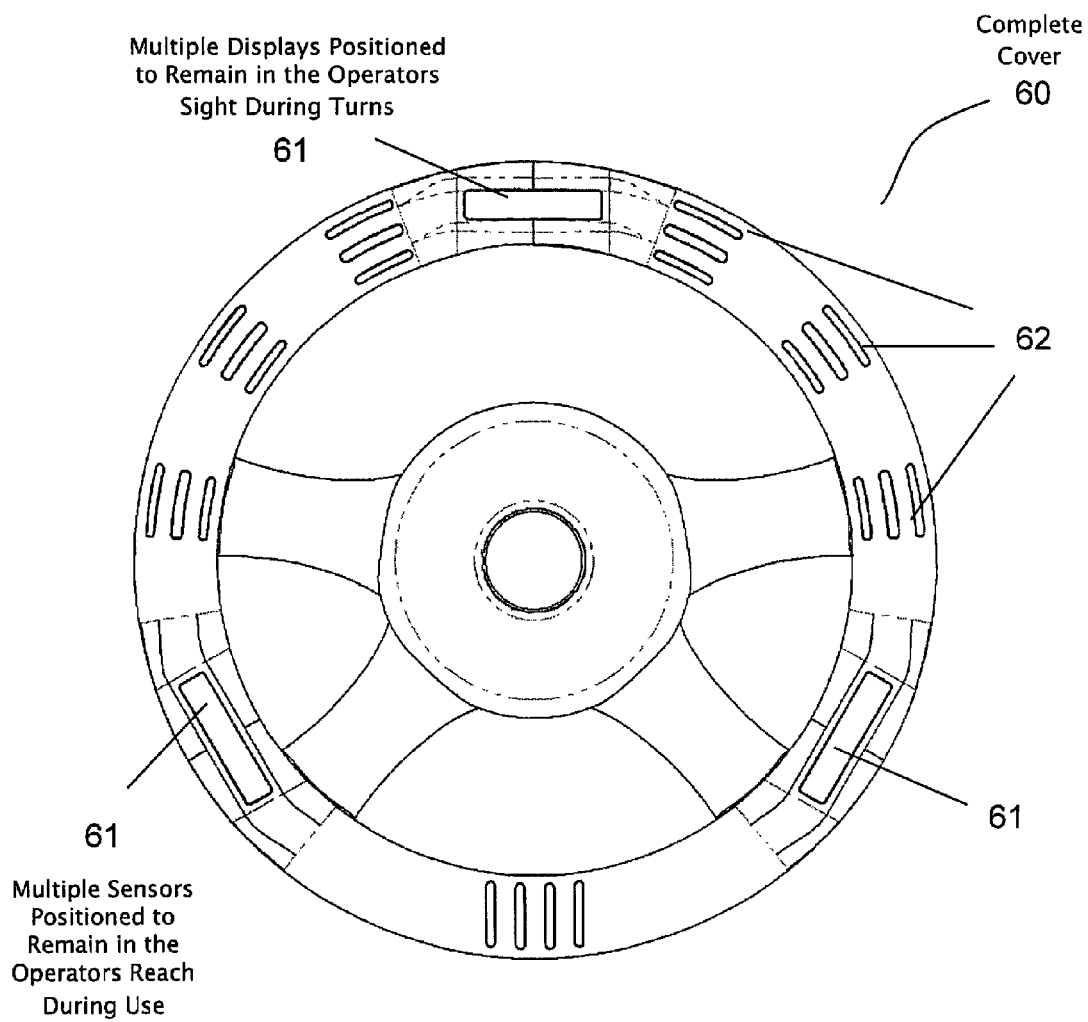
FIG. 6 is a view of a steering wheel with a complete cover with 3 LCD displays and touch sense sensors.

FIG. 6 is a view of the control device implemented as a steering wheel with a complete cover 60. Such a cover 60 may include an exemplary three LCD displays 61, and touch sense sensors 62 disposed about the periphery of the steering wheel.

The steering wheel remote may implement multiple displays 61 for example, three are shown. In the example 60 three displays 61 are positioned substantially 120 degrees from each other, positioned to provide a display substantially on top, and in the drivers line of sight when the wheel is rotating during turns and the like.

The touch sense strips 62 may be disposed at an exemplary seven areas with three pads in a group to allow finger touch sense for forward and backward slide. Alternatively more pads may be provided.

Figure 7:
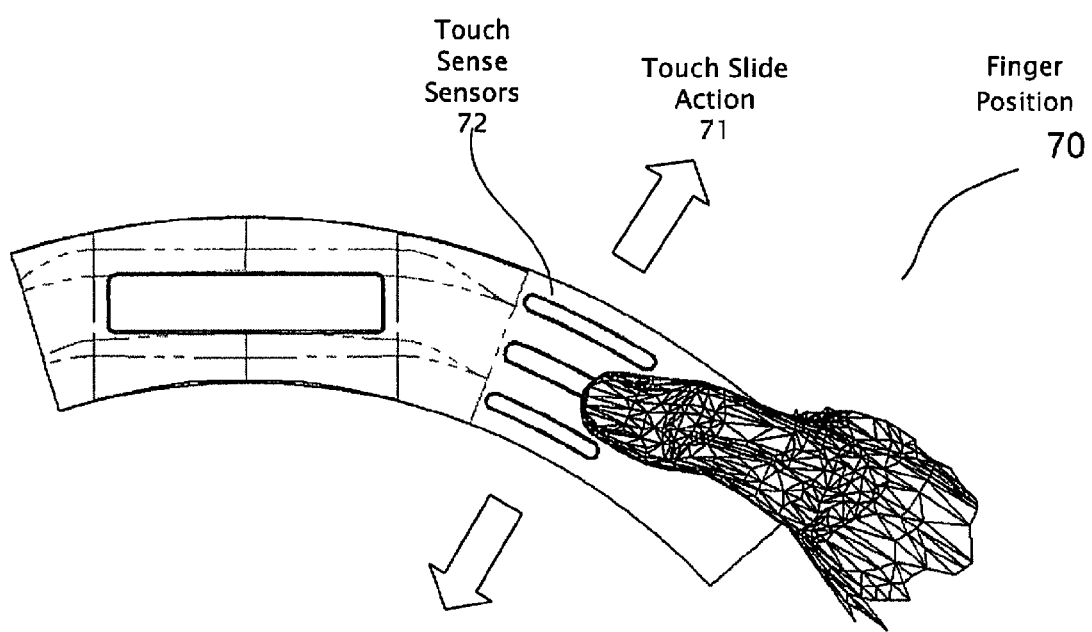
FIG. 7 is a view of touch slide action by the driver across the touch sense pads.

FIG. 7 is a view of touch slide action 71 by the driver across the touch sense pads 72. The positions and the geometry of the slides are selected for the most ergonomic finger position 70.

The touch sense stripe may have different angles and various positions on the steering wheel, and this may be accounted in the design.

The configuration of the touch pads can vary depends on the control level and variety of finger gestures to be captured. As example if there is a zoom in/out action necessary the pads configuration may incorporate increased number of horizontal or vertical pads and may include two or more layers of touchpad pattern instead simple slider stripes.

Figure 8:
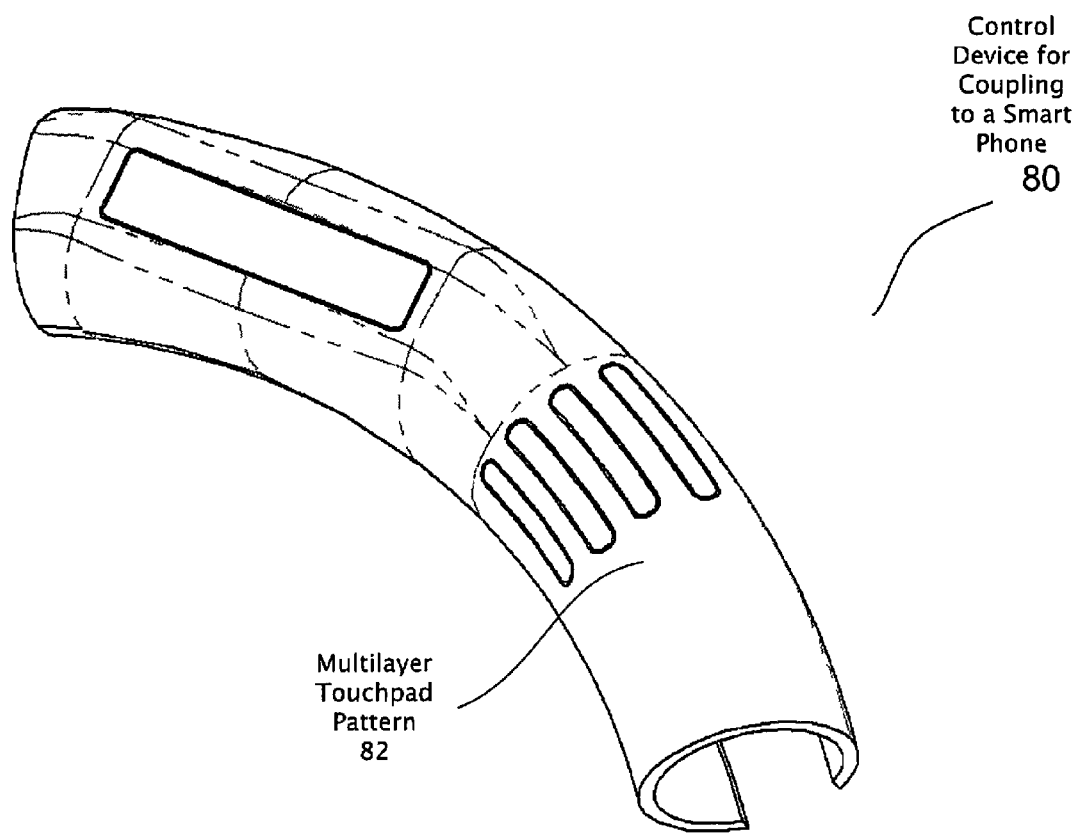
FIG. 8 is one configuration for connecting the remote control to the smart phone.

FIG. 8 shows an alternative configuration of the remote control for coupling to a smart phone 80. As shown, a multilayer touchpad pattern 82 may be provided analyze two finger touch or the like that may provide a larger number of finger gestures that can be analyzed from an interpreter (not shown) and/or programmed from a cell phone application program. The remote control 80, as shown, may be implemented as a substantially hard cover that snaps to an existing conventional steering wheel in order to provide flexibility of removing the control device when changing vehicles.

Figure 9:
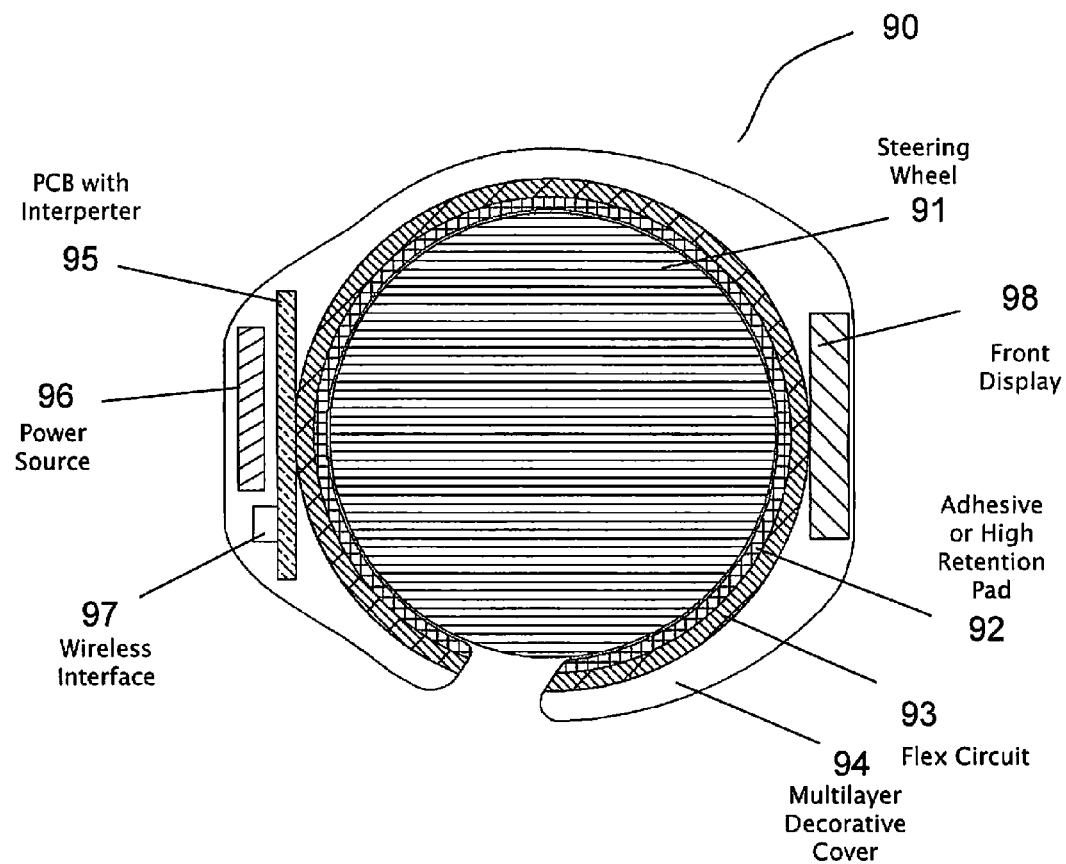
FIG. 9 is a second configuration for connecting the remote control to the smart phone and a radio using wireless manners.

FIG. 9 shows a cross section of the configuration for connecting the remote control to the smart phone and a radio using wireless signals. The drawing 90 shows a multilayer decorative cover 94, that incorporates a front display 98, flex multilayer circuit 93, adhesive or high retention pad 92 that snaps around the steering wheel 91. The circuit controller/interpreter is disposed on a rigid or flex PCB 95 incorporating wireless interface 97 and a power supply source or battery 96.

Figure 10:
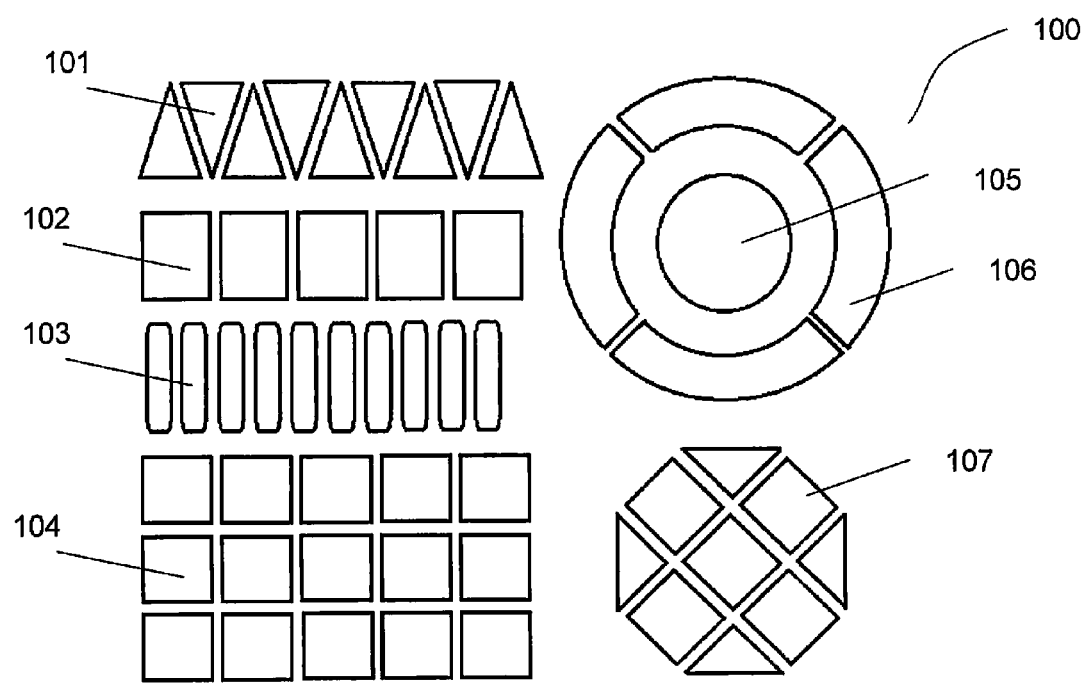
FIG. 10 shows a various touch pad configurations

FIG. 10 shows a various touch pad configurations that may be utilized in the examples described herein. The flex circuit (33 of FIGS. 3 and 93 of FIG. 9) is a multilayer film or printed circuit board (PCB) structure and may have various configurations related to the touch pads as shown incorporated into it. The most basic structure is a two layer button 105 type configuration that will activate upon point action. There can be a various button type of configurations including center line or round buttons or button 105 with slider 106 configuration. The circuit may have only a slider configuration 101 that will record finger slide action. The slider configurations may have various geometries of the pads and contours 101, 102, 103. The touch sense layer may utilize a touch pad 104, 107 configuration implemented in cross layers of cap sense pads to detect 2 finger actions and perform zoom in and out, drag in and out, etc.

Figure 11:
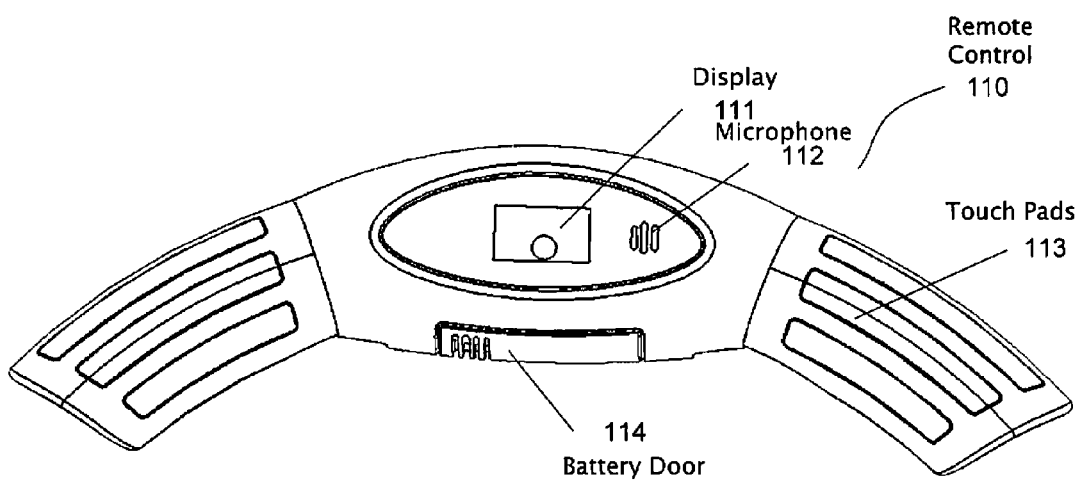
FIG. 11 is an ornamental remote control.

FIG. 11 shows another example where the remote control 110 is designed as clip on to the steering wheel. The front of the remote has embedded display 111 and microphone 112. The touch pads 113 are embedded on both side of the screen. Battery door 114 allows the battery to be changed.

Figure 12:
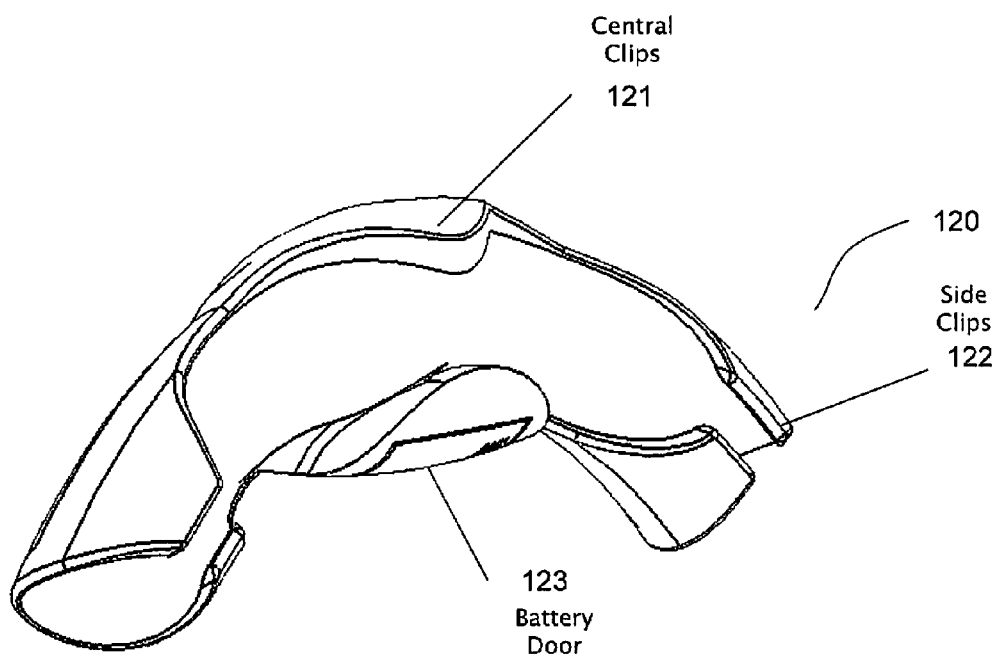
FIG. 12 is a rear side remote control view.

FIG. 12 is a rear side view of the remote control of FIG. 11. The rear view 120 of the remote control (110 of FIG. 11) is shown. The central clips 121 and the side clips 122 allow the remote to be installed securely on the steering wheel. The battery door 123 allows access to the battery.

Figure 13:
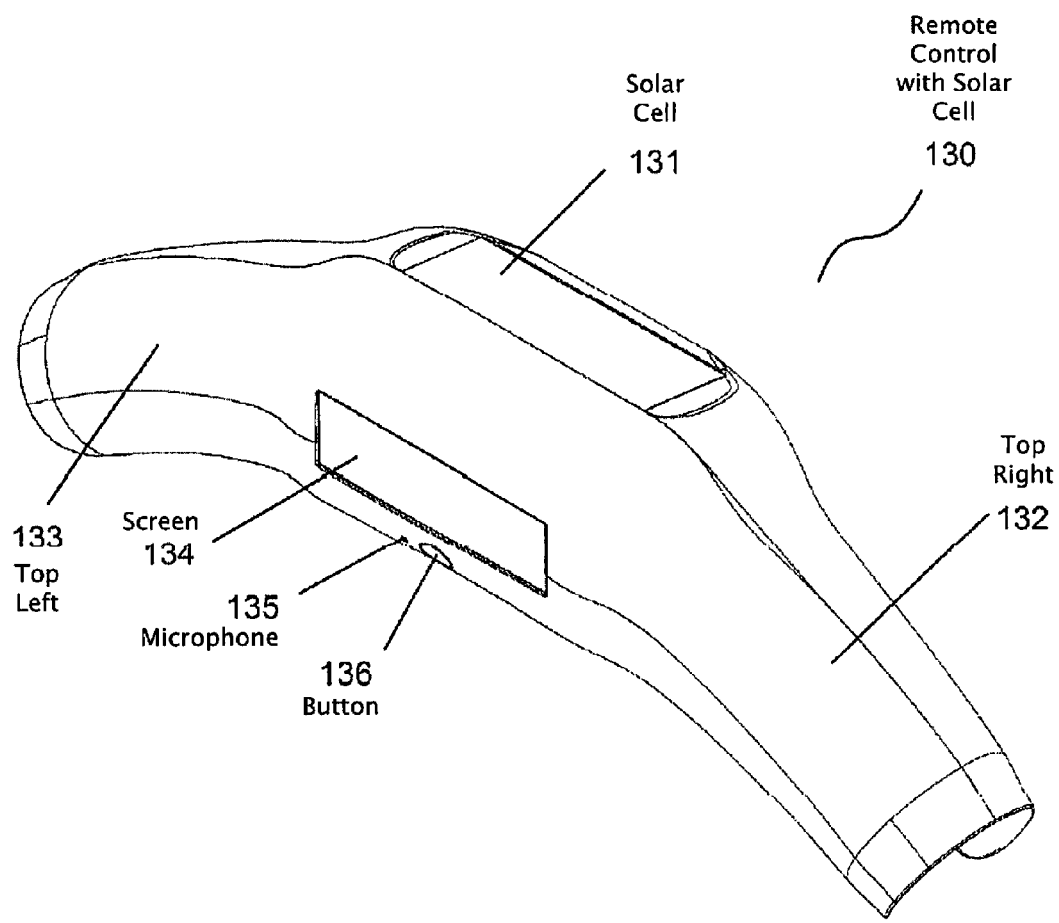
FIG. 13 shows an alternative example of the invention.

FIG. 13 shows another alternative example of the invention 130. In the remote control 130 a solar cell 131 is installed. On the top right 132 and top left 133, sense pads (not shown) are disposed under the plastic (or its equivalent) cover that makes up a housing for the remote control 130. An LCD screen (or its equivalent) 134, microphone 135 and a button, switch or equivalent 136 are provided on the front. The solar cell 131 may provide power directly, or keep an internal battery (not shown) charged. The display 134 communicates information to the driver, and the button, and sense pads may allow input from the driver.

Figure 14:
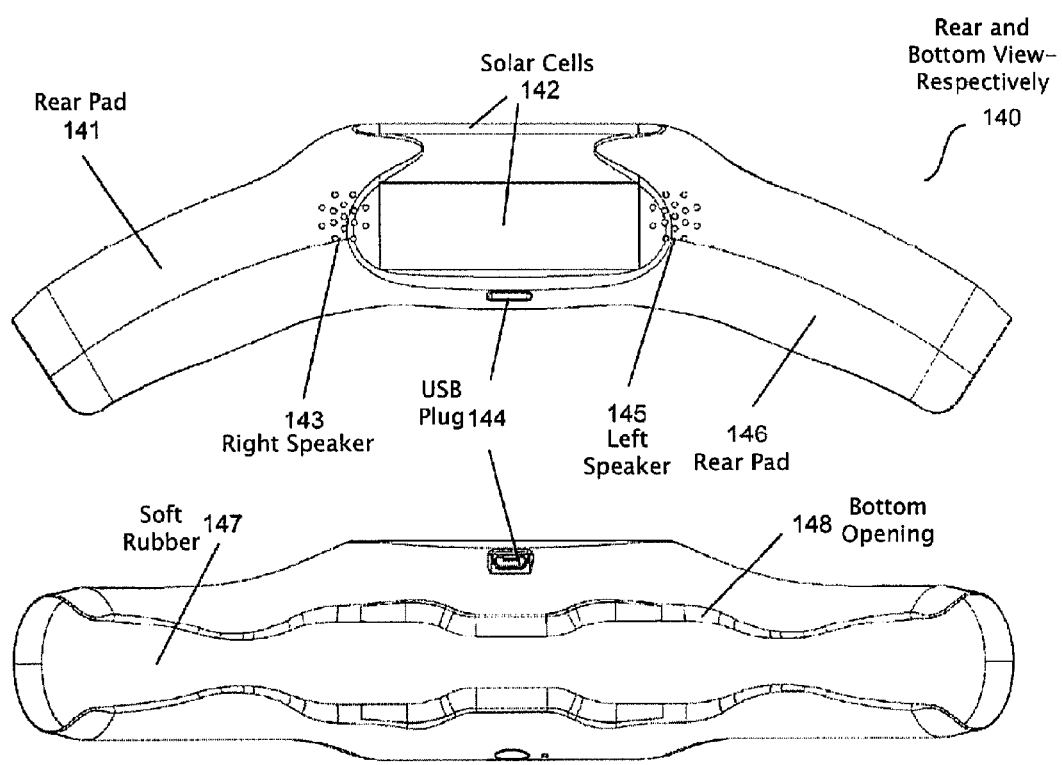
FIG. 14 shows a rear and bottom view of the example shown in FIG. 13.

FIG. 14 shows a rear and a bottom view 140 of the example shown in FIG. 13. A rear pad 141 and 146 are installed under the plastic, a second solar cell 142 on the rear compliments the one on the top to augment charging. Also included are right 143 and left 145 speakers installed on the rear. A USB plug 144 disposed in the housing allows charging and communication with the circuitry therein. Bottom opening 148 is shaped for easy installation and soft rubber 147 is installed inside to provide a firm grip between the housing and steering wheel (not shown).

Figure 15:
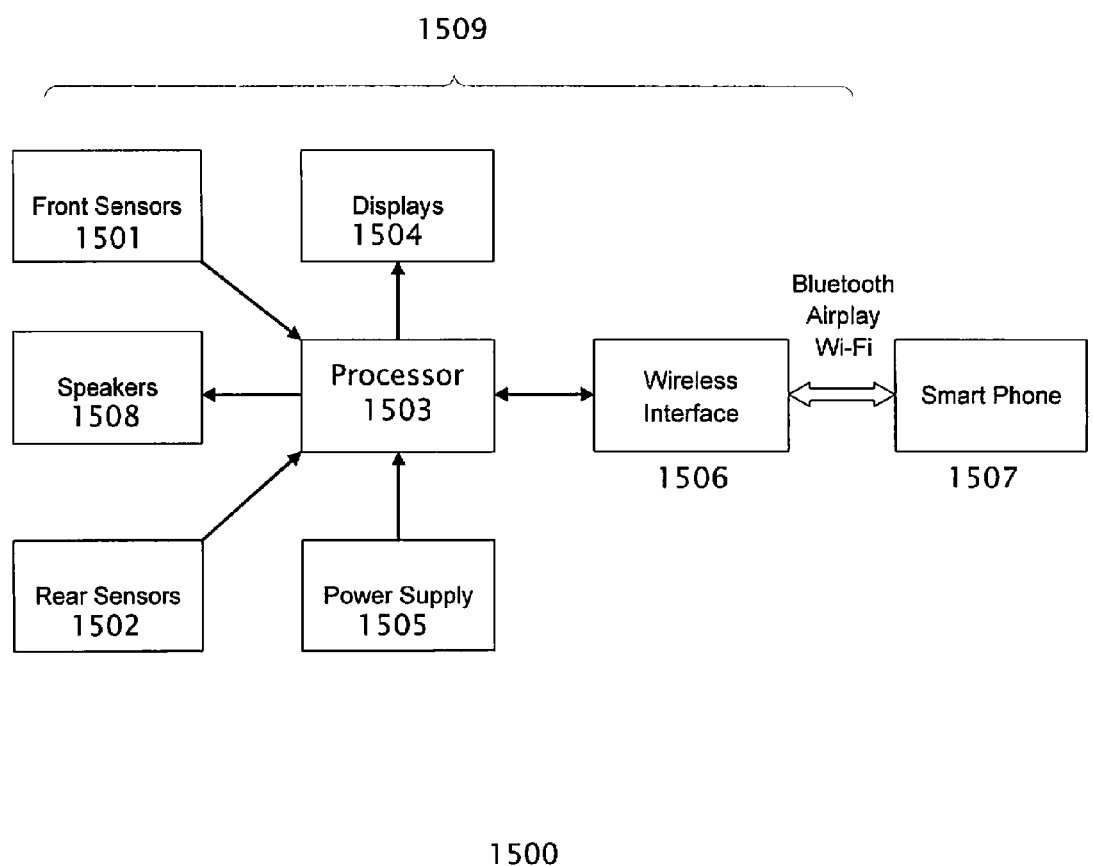
FIG. 15 is a block diagram of a first configuration for connecting the remote control to the smart phone.

FIG. 15 is a block diagram of a first configuration for connecting the remote control to the smart phone 1500. The front and rear sensor groups 1501, 1502 provide outputs that are coupled to the micro controller or processor 1503 provided with programming to facilitate interpretation. The interpreter may couple to one or multiple a displays 1504 and be coupled to power 1505 from the vehicle or a local battery. The wireless interface 1506 is preferably Bluetooth (or its equivalent) that provides direct phone pairing and control to a smart phone or equivalent wireless device 1507. In this manner the remote control uses built in speakers 1508 or the cell phone speakers for audio output.

Figure 16:
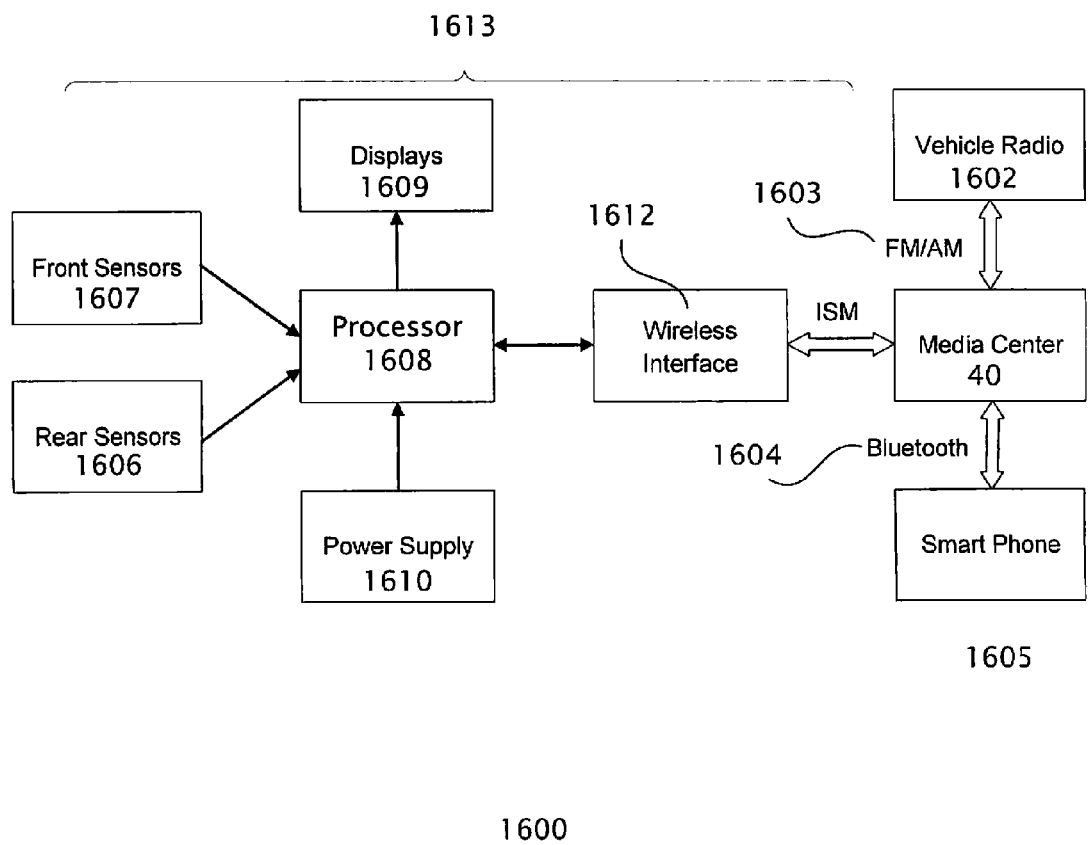
FIG. 16 is a block diagram of a second configuration for connecting the remote control to the smart phone and a radio using wireless coupling.

FIG. 16 is a block diagram of a second configuration 1600 for connecting the remote control to the smart phone and a radio using wireless coupling through the previously described media center 40. The block diagram describes a remote control configuration where an audio signal is coupled to the vehicle speakers 1602 via an FM channel 1603. In this application the media center 40 provides the FM modulation capability and Bluetooth (and/or Wi-Fi, or equivalent) pairing 1604 with the phone 1605. The sensors 1606, 1607 are connected to the processor 1608 providing interpretation functionality, and display 1609 function may be engage while the wireless interface 1612 between the remote control and the media center 40 is a low power and low range link to conserve battery life. A power source 1610 is coupled to the processor 1608.

Figure 17:
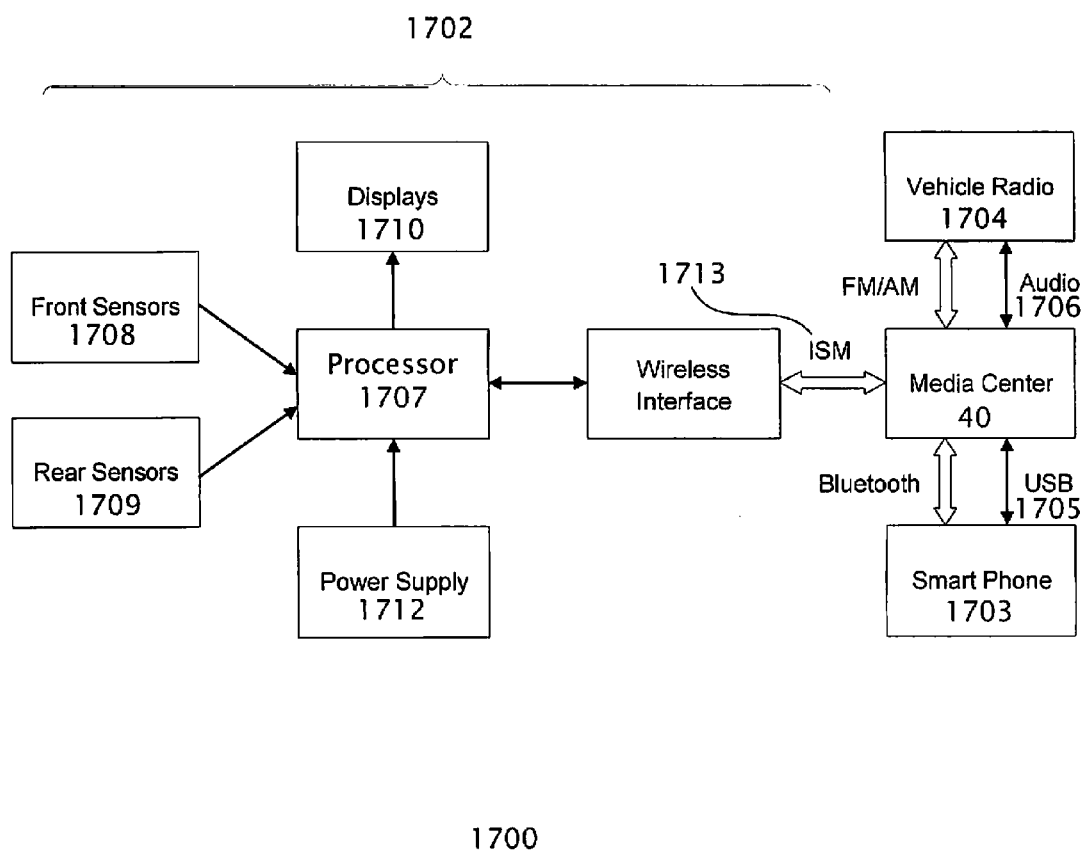
FIG. 17 is a block diagram of a third configuration for connecting the remote control to the smart phone and a radio using wired coupling.

FIG. 17 is a block diagram of a third configuration 1700 for connecting the remote control 1702 to a smart phone 1703 and a radio 1704 using wired coupling 1705. 1706. A full featured system configuration is shown. The processor or interpreter 1707 reads the touch sensors 1708, 1709 and controls display 1710 as in the previous examples. The remote control 1702 is powered 1712 from the vehicle or a battery and connected to a media center via low power low bandwidth wireless link (IR or RF) 1713. The media center 40 is a designed as automotive accessory that may be installed behind the dash board with access to the radio harness, or in any convenient location. From that harness the connection utilizes the power and audio lines, and the USB plug installed in the vehicle dash panel (not shown) allows accessory charging and wired play.

A process for interpreting the finger activity is implemented in the interpreter circuitry to provide a robust touch sense of the finger slides by monitoring the rear sensors and taking decisions only from the front pads in the proximity of the rear hand touch. The display when used may provide ability for calibration of the touch sense and visual response to a finger slide.

Further the interpreter can develop a gesture language to improve the touch slide actions. Increasing the number of radial front pads may add new gestures as zoom in and out controls for map or traffic solutions.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A steering wheel remote, applied to a steering wheel, comprising:
   a plurality of front sensors, disposed on the front side of the steering wheel in a circular manner, for detecting finger movement;
   a plurality of rear sensors, disposed on the back side of the steering wheel in a circular manner, for detecting hand position; wherein each of the rear sensors is designated to at least one of the front sensors;
   a controller coupled to the front sensors and the rear sensors; and
   wherein the controller analyzes information from at least one of the plurality of the front sensors, to make decisions and provides coupling to a smart phone;
   wherein the controller make decisions only from the front sensor when the designated rear sensor detects hand position.

2. The steering wheel remote of the claim 1 where the plurality of direct gesture sensors, and the controller are integral to an original equipment ("OEM") steering wheel.

3. The steering wheel remote of the claim 1 where the plurality of direct gesture sensors, and the controller are integral to a full cover disposed over substantially all of the steering wheel.

4. The steering wheel remote of the claim 1 where the plurality of direct gesture sensors, and the controller are integral to an ornamental cover disposed over a portion of the steering wheel.

5. The steering wheel remote of the claim 1 where the plurality of sensors are placed on the front and/or rear side of the steering wheel to allow hand position and movement detection.

6. The steering wheel remote of the claim 1 where the direct gesture sensors provide outputs suitable for further processing providing a two dimensional information for touch induced signals and three dimensional information produced from gesture signals.

7. The steering wheel remote of claim 1 further comprising a display, said display is an LCD display.

8. The steering wheel remote of the claim 1 where the sensors and the controller circuitry are disposed in a steering wheel cover.

9. The steering wheel remote of the claim 1 where the sensors and the controller circuitry are installed in a steering wheel cover piece.

10. The steering wheel remote of the claim 1 where the controller circuitry includes wireless interface capabilities and communicates to a wireless device.

11. The steering wheel remote of the claim 1 where the controller circuitry is powered with a battery charged from a solar cells disposed on the rear or top of the steering wheel.

12. The steering wheel remote of the claim 1 further comprising a wireless interface coupled to a secondary controller of a media center device that couples to a cell phone.

13. The steering wheel remote of the claim 12 wherein the media center device is installed at the radio harness.

14. The steering wheel remote of the claim 1 wherein sensors, of the plurality of sensors, on the top of the wheel can be radial or positioned on an angle.

15. The steering wheel remote of the claim 1 wherein the sensors may or may not be exposed to the surface of the steering wheel.

16. The steering wheel remote of the claim 1 wherein the plurality of rear sensors on the rear side of the steering wheel are distributed evenly for the purpose of detecting a hands position on the steering wheel, whereby the rear sensor coordinate a process for recognition of finger gestures, and activate the front sensors above the hands position.

17. The steering wheel remote of the claim 1 wherein the plurality of sensors are constructed from a multilayer capacitive touch film technology.

18. A steering wheel remote control comprising:
a cover disposed over a steering wheel outer ring;
a plurality of front sensors, disposed on the front side of the cover in a circular manner, for detecting finger movement;
a plurality of rear sensors, disposed on the back side of the cover in a circular manner, for detecting hand position; wherein each of the rear sensors is designated to at least one of the front sensors;
a controller, coupled to the front sensors and the rear sensors, wherein the controller takes input only from the front sensor when the designated rear sensor detects hand position;
a power source disposed in the cover and coupled to the controller; and
a wireless interface circuit to couple the controller to a remote wireless device to be controlled.

19. The steering wheel remote control of claim 18 wherein the remote wireless device is a smart phone.

20. The steering wheel remote control of claim 18 wherein the cover is a multilayer structure having a flex circuit disposed in a middle layer to couple the plurality of front and rear touch sensors to the controller.

21. The steering wheel remote control of claim 20 wherein a layer contacting the steering wheel is insulating to protect the sensors from contacting the steering wheel.

22. A method of remotely controlling a wireless device comprising:
determining whether a hand position on a steering wheel is detected by one of a plurality of rear sensors disposed on the back side of the steering wheel in a circular manner;
accepting an input to a controller from a determined hand position; and
controlling the wireless device by finger movement in the determined hand position;
wherein the input is from at least one of a plurality of front sensors disposed on the front side of the steering wheel in a circular manner and each of the rear sensors is designated to at least one of the front sensors, and the controller takes input only from the front sensor when the designated rear sensor detects hand position.

23. The steering wheel remote of the claim 1 where coupling to a device capable of controlling a smart phone is provided by a wired connection integral to the steering wheel wiring.

* * * * *